Patented Sept. 11, 1945

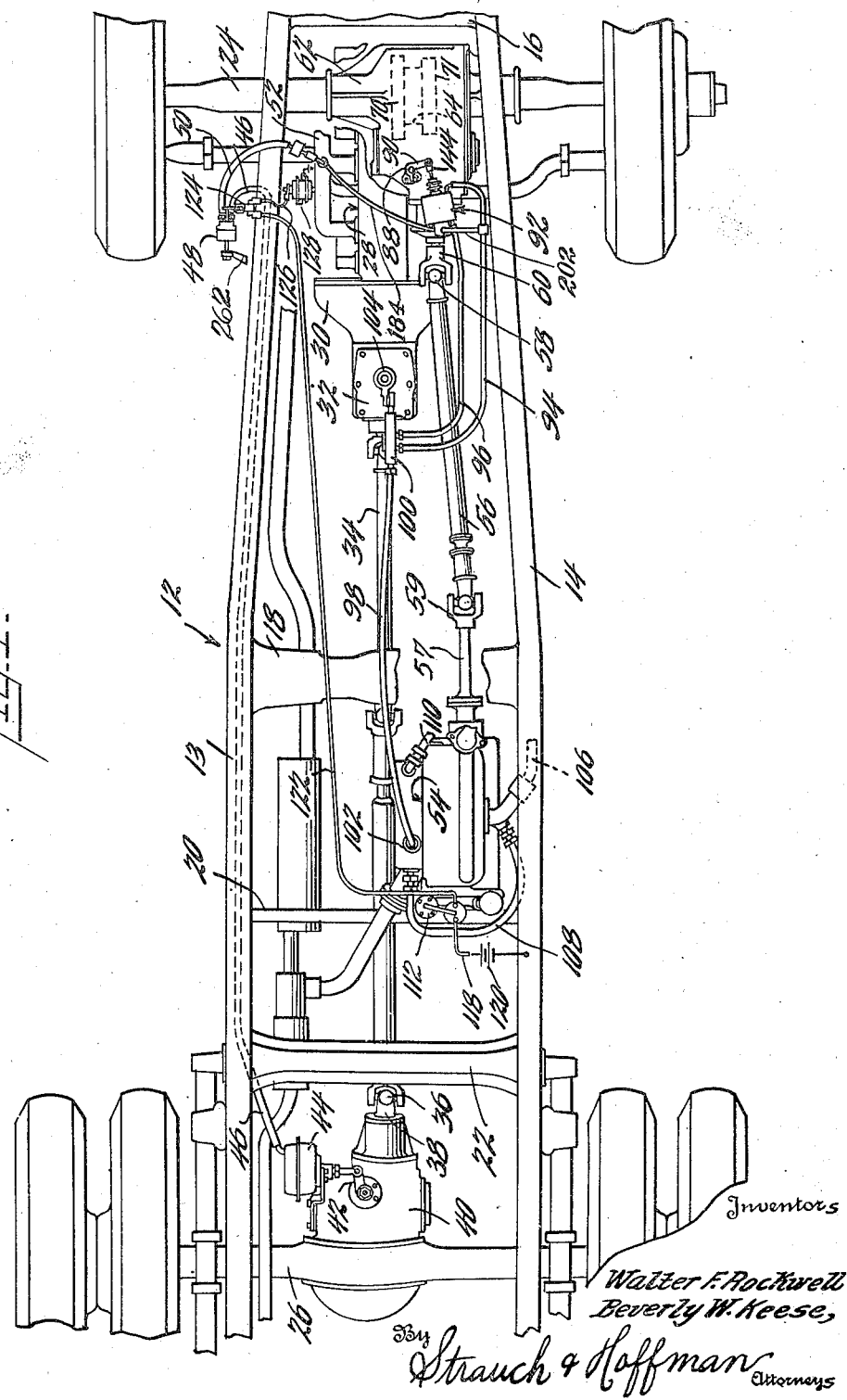

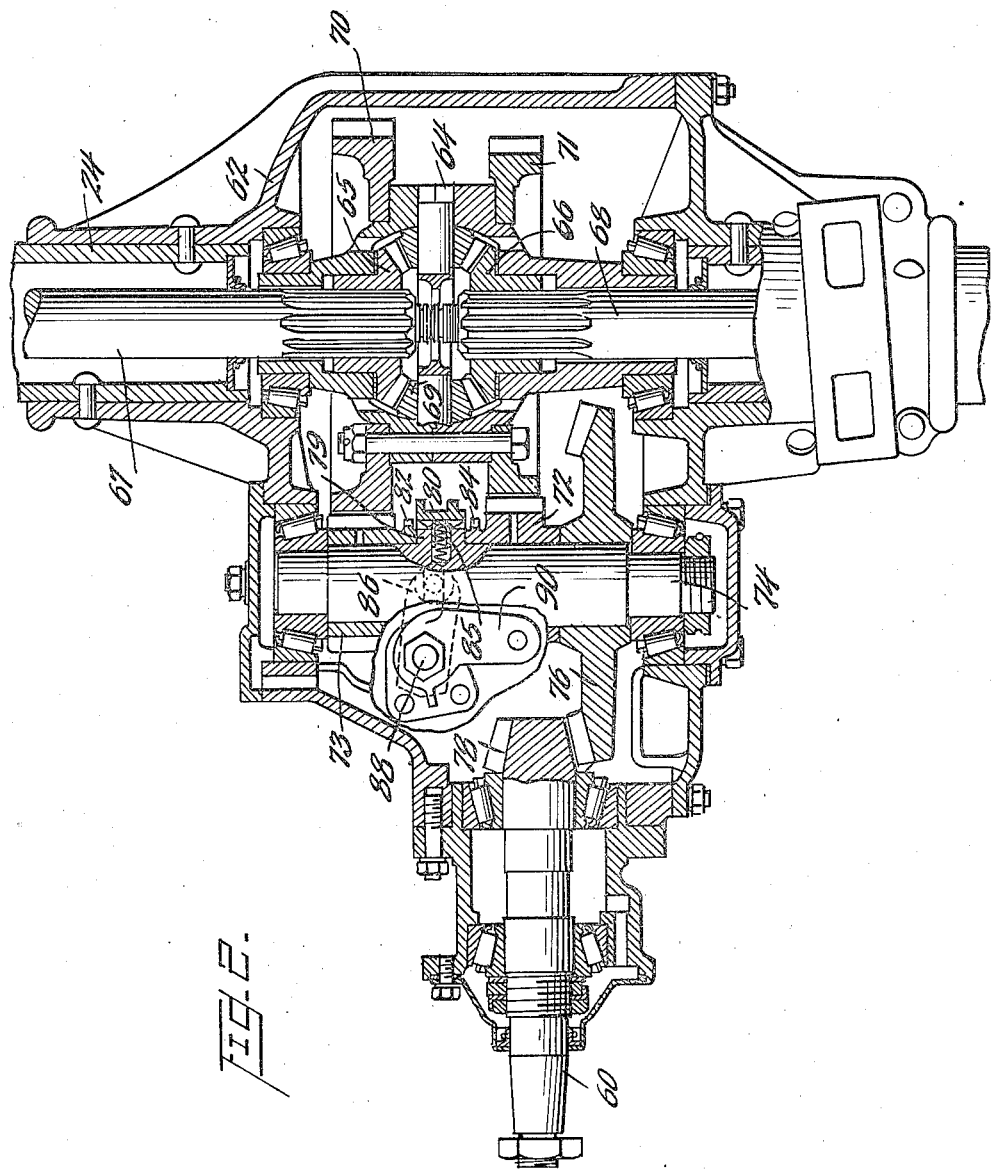

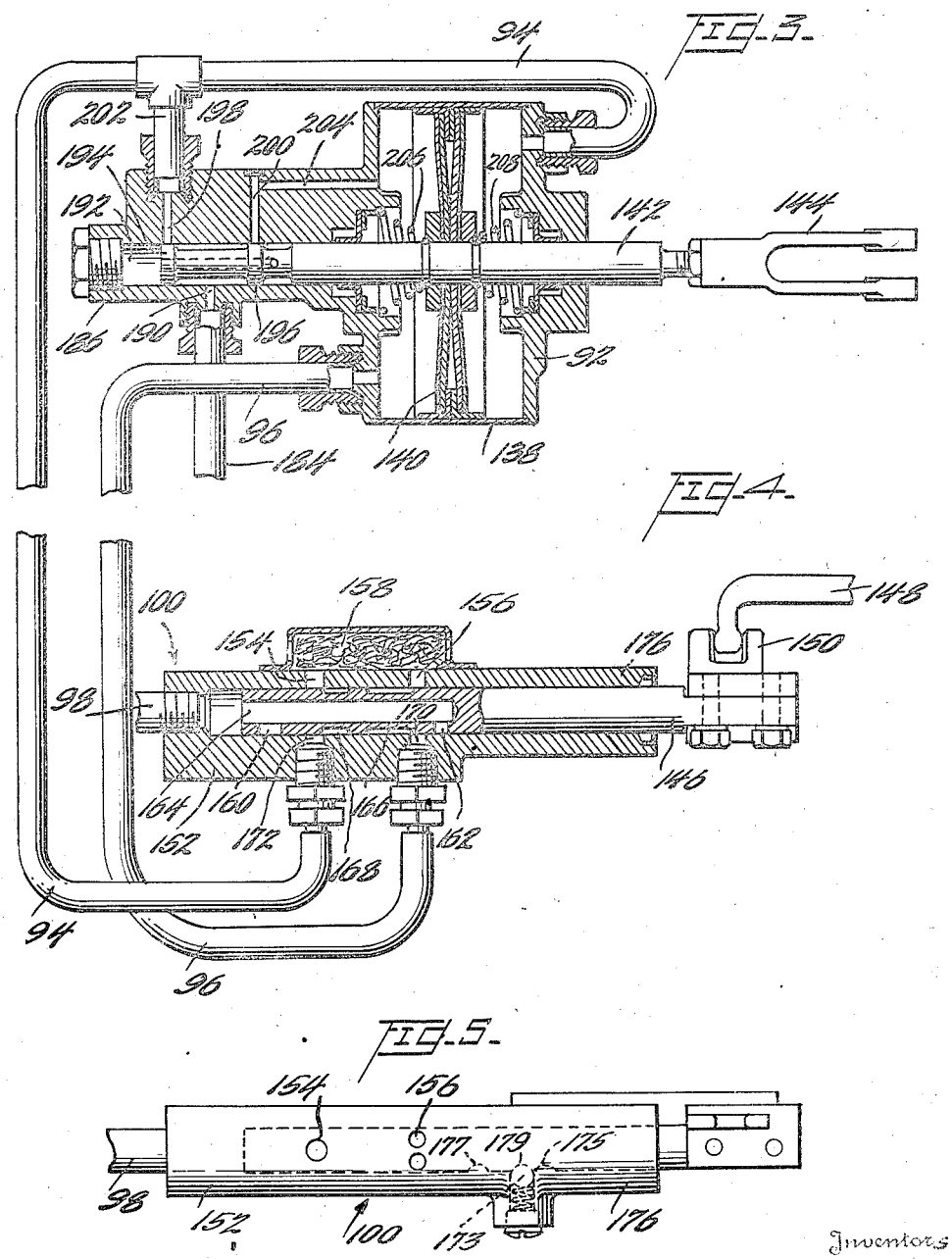

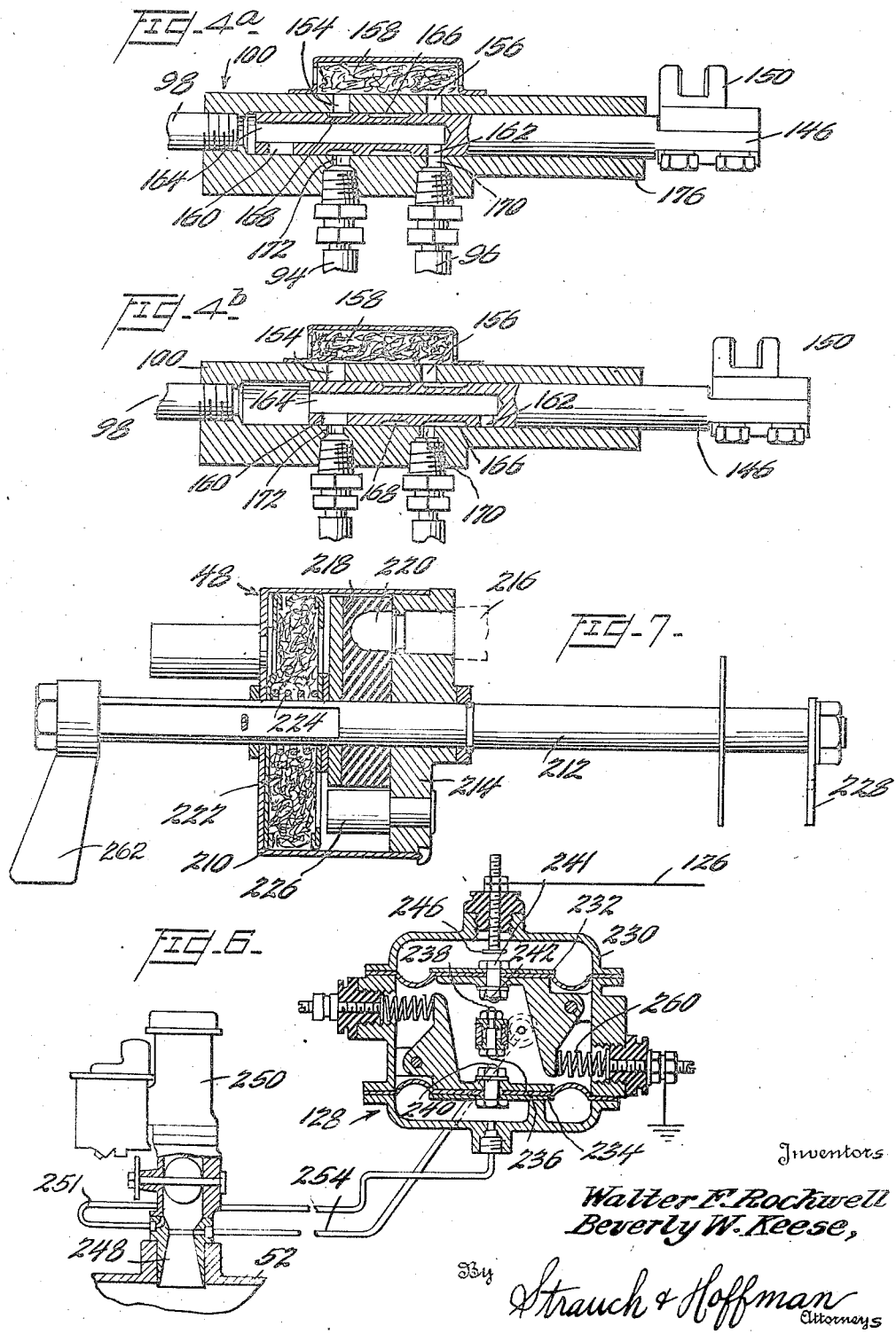

2,384,781

UNITED STATES PATENT OFFICE 2,384,781

AUTOMOTIVE VEHICLE

Walter F. Rockwell, Detroit, Mich., and Beverly W. Keese, Oshkosh, Wis., assignors to The Timken-Detroit Axle Company, Detroit, Mich., a corporation of Ohio Application October 16, 1943, Serial No. 506,582

25 Claims. (Cl. 180—54)

This invention relates to improvements in motor vehicles and has particular reference to improvements in vehicles of the character disclosed in co-pending applications Serial Nos. 356,214, filed September 10, 1940, 432,520, filed February 26, 1942, and Serial No. 527,782, filed March 23, 1944.

It has been proposed to provide heavy duty automotive vehicles, such as buses and trucks, with a main driving engine to supply the motive power under ordinary driving conditions and with an auxiliary engine to supply additional power and traction under driving conditions involving heavy grades or soft road surfaces to reduce the amount of low gear operation of the vehicles to thereby maintain a higher average speed and improve the fuel consumption of the vehicles. Some of these proposed arrangements, as particularly exemplified in the above-mentioned co-pending applications, provide a main engine operatively connected with the rear driving axle or axles of the vehicle through the conventional clutch and gear transmission and an auxiliary engine drivingly connected with the front axle of the vehicle. It has also been proposed to connect the main engine with its associate drive axle through a two-speed gear drive incorporated between the main engine propeller shaft and the differential mechanism associated with the drive axle. In these proposed devices, a gear transmission similar in function to the main engine drive transmission is interposed between the auxiliary engine and the vehicle axle driven by it, such auxiliary engine transmission having gear ratios such that with the main engine drive in the low speed axle drive gear the speed of the auxiliary engine will be maintained within a predetermined operating range.

In the arrangement disclosed in the aforesaid co-pending applications Serial No. 432,520 and 527,782, the auxiliary engine is brought into operation only when the main engine is driving through the low speed axle gear drive and has reached a predetermined high torque output at a predetermined low speed.

Both automatic and manual means have been proposed to bring the auxiliary engine into operation after the main engine has been shifted to its low speed axle drive ratio.

It has been found that the inclusion of a complete gear transmission corresponding to the main engine drive transmission between the auxiliary engine and its propeller shaft is not necessary to satisfactory operation of the vehicle, particularly on paved roads in non-mountainous territory, and it is among the objects of the present invention to provide a simplified driving connection between the auxiliary engine and the vehicle axles driven thereby to thereby eliminate various unessential mechanical elements while retaining their useful function, thus reducing both the weight of the installation and the liability to mechanical failure or unsatisfactory operation.

More specifically, it has been found to be desirable to operate the auxiliary engine only when the main engine is driving through the low speed axle drive gear and through one of the two upper speed ratios of the conventional change speed transmission. The two engines operating together supply ample power to avoid the necessity of shifting the main change speed transmission below the second highest gear ratio in nearly all open road driving conditions in reasonably level country, and the main engine alone supplies sufficient power for those low speed driving conditions, such as driving in heavy traffic or through congested areas, when it is necessary to use the lower speed ratios of the main change speed transmission.

Since, at least under the indicated driving conditions, the assistance of the auxiliary engine is necessary only when the main engine change speed transmission is in one or the other of the two highest speed gear ratios, it is necessary to provide only two drive gear ratios for the auxiliary engine and these two ratios may be conveniently incorporated in the front drive axle between the auxiliary engine propeller shaft and the front axle differential, thus eliminating the necessity of a conventional change speed transmission and clutch for the auxiliary engine.

It is also contemplated that either an automatic or a manual control for the starting of the auxiliary engine may be incorporated as may be desired.

It is therefore among the objects of the invention to provide a vehicle having a main and an auxiliary engine connected to respective driving axles in which both driving axles are provided with selectable ratio two speed drive gears but only the main engine has a change speed transmission in addition to the two speed axle drive gear.

It is a still further object of the invention to provide a vehicle having a main driving engine and an auxiliary engine drivingly connected with respective drive axles through respective two-speed axle driving gears with a change speed transmission for the main engine only in which the high speed gear ratio for the auxiliary engine corresponds to the direct transmission drive and low speed axle drive gear ratio of the main engine, and the low speed axle drive ratio of the auxiliary engine corresponds to the third speed transmission gear ratio times the low speed axle drive gear ratio of the main engine.

A further object resides in the provision of an improved automatic control for the auxiliary engine which will bring the auxiliary engine into operation only when the main engine is driving through the direct or third speed transmission gear ratios and through the low axle drive gear ratio and the torque of the main engine reaches a predetermined maximum value as indicated by the value of its manifold pressure and velocity.

Another object resides in the provision in a two engine vehicle of the character indicated of a manual control for the auxiliary engine which may be substituted for the above-mentioned automatic control or may be provided in addition to the automatic control to permit operation of the auxiliary engine under emergency conditions in which it would not be brought into operation by the automatic control.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only since it will be apparent to those skilled in the art that various changes in the illustrated embodiment may be resorted to without in any way exceeding the scope of the invention.

In the drawings:

Figure 1 is a top plan view of the chassis of a vehicle constructed according to the invention, portions being broken away and shown in section to better illustrate the construction thereof;

Figure 2 is a plan view of a portion of the vehicle front axle, parts being broken away and shown in section to particularly illustrate the front axle drive gear.

Figure 3 is a longitudinal sectional view of a pneumatic power unit for shifting the auxiliary engine drive gear ratio;

Figure 4 is a longitudinal sectional view of a pneumatic valve constituting a portion of the automatic control for the auxiliary engine, showing the valve in its neutral position;

Figure 4a is a sectional view of the valve shown in Figure 4 showing the valve in one operative position;

Figure 4b is a sectional view of the valve shown in Figure 4 showing the valve in a different operative position from that shown in Figure 4a;

Figure 5 is an elevational view of the pneumatic valve shown in Figure 4;

Figure 6 is a longitudinal sectional view through an automatic switch unit constituting a portion of the automatic control for the auxiliary engine; and Figure 7 is a longitudinal sectional view through a manually operable pneumatic valve for controlling the shifting of the two ratio main engine axle drive gear.

The vehicle, as particularly illustrated in Figure 1, has a frame, generally indicated at 12, comprising side rails 13 and 14 connected by cross-members as indicated at 16, 18, 20 and 22. This frame is supported by means of suitable springs on a front axle 24 and a rear axle 26, both axles being equipped with ground engaging wheels in the conventional manner. A main engine, generally indicated at 28, is supported by the forward portion of the frame adjacent the front axle 24 and carries a clutch 30 and change speed transmission 32 from which a propeller shaft 34 extends to a universal joint 36 which drivingly connects it to a stub shaft 38 leading into a gear housing 40 which contains the differential gear mechanism and a two speed drive gear mechanism which may be of the character particularly illustrated and described in United States Patent No. 2,183,667 issued December 19, 1939 to Lawrence R. Buckendale. The shift from one gear ratio to the other of this two speed gear mechanism is accomplished by a clutch shaft having an arm 42 actuated by a pneumatic power unit 44 connected through a pneumatic conduit 46, a selecting valve (generally indicated at 48 and illustrated in detail in Figure 7) and a pneumatic conduit 50 with the interior of the main engine intake manifold 52.

An auxiliary engine, generally indicated at 54, is mounted on the frame at a position intermediate its length, for example, on the cross-members 18 and 20, and is connected through a propeller shaft 56, power shaft 57, and universal joints 58 and 59 with a stub shaft 60 projecting from a gear case 62 which houses a front axle differential gear and a two speed gear drive mechanism as shown in detail in Figure 2.

The front axle differential comprises a support 64 mounting pinion gears 65 and 66 drivingly connected with respective axle shafts 67 and 68 and spider gears 69. The two speed drive gear for the front axle may conveniently comprise a pair of gears 70 and 71 of different numbers of gear teeth rigidly mounted on the differential support 64 and meshing with respective gears 72 and 73 also having different numbers of gear teeth and rotatably mounted on a shaft 74 supported by suitable anti-friction bearings in the gear housing 62. The shaft 74 is driven by a gear train comprising the beveled ring gear 76 fixed on the shaft 74 and the meshing beveled pinion gear 78 fixed on the end of the stub shaft 60. Intermediate its length the shaft 74 is provided with a splined or non-circular portion 79 upon which is slidably mounted a clutch collar 80 having at the opposite sides thereof internal clutch teeth engageable selectively with clutch teeth 82 and 84 provided on the gears 73 and 72 respectively whereby either gear may be drivingly associated with the shaft 74.

The clutch collar is releasably retained in any one of its three operative positions in which it either engages the gear 72 or the gear 73 or occupies a neutral position out of engagement with both gears, by spring pressed detents 85 engageable in any one of three spaced notches provided in the inner face of the clutch collar. The clutch collar is provided with an annular external groove which receives a shifting fork 86 mounted on a pivoted shaft 88 turned by a lever arm 90 operatively connected with a pneumatic power unit, generally indicated at 92, and particularly illustrated in Figure 3.

The speed ratios of the front axle drive gear are so chosen with respect to the low speed ratio of the rear axle that the auxiliary motor will operate in its efficient speed range while driving the front axle. For example, if the auxiliary or booster engine has the same torque-speed characteristics as the main or rear axle driving engine, then the high speed ratio of the front axle should correspond approximately with the combined ratios of the low speed ratio of the rear axle and the direct drive of the main engine transmission; and the low speed ratio of the front axle should correspond approximately with the combined ratios of the rear axle low speed and the main engine transmission speed immediately below direct drive.

Pneumatic power unit 92, in the illustrated embodiment, is operated by the pressure difference between atmospheric pressure and engine intake manifold pressure, the manifold pressure being applied through the conduits 94, 96 and 98, and the selecting valve generally indicated at 100 and particularly illustrated in Figures 4, 4a, 4b and 5. The conduit 98 extends from the intake manifold 102 of the auxiliary engine to the selecting valve 100 and the conduits 94 and 96 extend from the selecting valve to the opposite ends of the power unit 92. The selecting valve 100 is operatively connected to the gear shift 104 of the main engine transmission 32 for a purpose which will presently appear.

The auxiliary engine is connected with the main engine radiator 104 by suitable cooling liquid conduits, one of which is indicated at 106, and by-pass lines 108 and 110 supply fluid from the main radiator to the jacketed intake manifold of the auxiliary engine. In this manner the auxiliary engine is warmed by the cooling liquid from the main engine and is always in condition to start easily and immediately whenever its power is required.

The auxiliary engine is also provided with a relay switch, not illustrated, which energizes its ignition mechanism 112 and actuates its starter motor, not illustrated, through suitable automatic controls, also not illustrated and which may be any suitable switch known to the prior art. The relay switch is connected into an electric circuit comprising a portion 118 leading from the battery 120 to the relay switch, a portion 122 leading from the switch to a control switch 124 operatively connected with the selecting valve 48, and a portion 126 leading from the switch 124 to a vacuum actuated switch, generally indicated at 128 and particularly illustrated in Figure 6, connected with the intake manifold 52 of the main engine and through which the electric circuit may be completed either through the ground connection of the vehicle frame or a second wire, depending upon whether a single wire or a two-wire ignition system is utilized.

The relationship of switch 124 to control valve 48 is such that switch 124 is closed in the auxiliary engine starting circuit only when valve 48 is set in position for rear axle low gear ratio.

*Front axle ratio control*

Referring to Figures 3, 4, 4a, 4b, and 5, the power unit 92 comprises a cylinder 138 containing a reciprocable piston assembly 140 rigidly connected at its center to a rod 142 which projects through the end wall of the cylinder and is connected by means of the adjustable clevis 144 with the lever arm 90 on the end of the yoke shaft 88.

Movement of the piston assembly 140 is controlled by the application of a pneumatic pressure differential thereto through the conduits 94 and 96 connected with the selector valve 100.

As long as the auxiliary engine 54 is not operating, there will be no vacuum or manifold pressure below atmospheric pressure applied through the conduit 98 to the selector valve 100. However, when the auxiliary engine comes into operation, vacuum will be applied through the conduit 98 to the interior of the valve 100, and a hollow valve plunger 146, operatively connected through a link 148 and socket or gate 150 with the main transmission gear shift lever 104, controls the connection of the conduit 98 with the conduits 94 and 96, respectively. In order to accomplish this function, valve casing 152 may be provided with ports 154 and 156 opening to the atmosphere through filter 158 and the valve plunger may be provided with ports 160 and 162 leading from a bore 164 in the plunger to the exterior thereof, the bore 164 having an open end in communication with the conduit 98. Spaced annular recesses 166 and 168 are provided along the exterior of the valve plunger and are selectively registrable respectively with valve ports 156 and 154.

It is to be noted that when the valve plunger is in its centered or neutral position, shown in Figure 4, the passage 168 slightly overlaps both ports 154 and 172 while the passage 166 slightly overlaps both ports 156 and 170 thus connecting both ends of the power unit 92 with the atmosphere through restricted apertures.

As particularly illustrated in Figure 4a, when the main engine transmission gear is in its high speed or direct drive ratio, the port 162 will register with the port 170 leading into the conduit 96 actuating the unit 92 to shift the front axle drive to its high gear ratio, if there is vacuum in the conduit 98 and valve plunger bore 164. At the same time, the annular recess 168 will connect the port 172 at the end of conduit 94 with the port 154 which is connected with the atmosphere through the filter 158, and the detent 173 will engage in notch 175, Figure 5, to steady the valve plunger in this operative position. When the main transmission is shifted to its third speed gear ratio, plunger 146 will be moved to cause the port 160 to register with port 172, as particularly illustrated in Figure 4b, thereby applying vacuum from the line 98 to the conduit 94 and at the same time the annular recess 166 will connect port 170 with port 156 and the atmosphere through filter 158, thus actuating the power unit 92 to shift the front axle gear drive to its low gear ratio. Detent 173 in this case engages in notch 177. When the valve is in its centered or neutral position the detent engages in notch 179 as illustrated in Figure 5.

In order to avoid the possibility of the front axle gear clutch becoming accidentally engaged at some time other than when the main engine is driving through the low ratio of the rear axle drive gear and through either the direct or third speed ratio of its four speed transmission, the clutch shifting unit 92 is provided with pneumatic centering means effective whenever the main engine is operating to urge the piston assembly 140 to its centered or neutral position in which the front axle drive is declutched.

For this purpose one cylinder end of the cylinder 138 is provided with an apertured elongation 186 slidably receiving an extension of the piston rod 142. A conduit 184, connected at one end with the interior of the main engine intake manifold, is connected at its opposite end through a port 190 with the aperture or bore 192 through the cylinder end elongation 186.

Within the bore 192 the shaft 142 is provided with spaced valve pistons 194 and 196 which cooperate with spaced valve ports 198 and 200. The port 198 leads through a connection 202 into the conduit 94 and the port 200 is connected through a passage 204 with the space within the cylinder 138 on the opposite side of the piston from the space connected with the conduit 94.

Since, as explained above, the valve 100, when in its centered or neutral position connects both conduits 94 and 96 and the corresponding ends of the cylinder 138 with the atmosphere through restricted apertures, the pressure on both sides of the piston assembly 140 is nominally balanced when the front axle drive is declutched. When the piston assembly is centered, the valve pistons 194 and 196 close the ports 198 and 200, respectively, preventing the application of main engine manifold vacuum to either side of the piston assembly. If either of these ports is opened by movement of the shaft 142 away from its centered position while the valve plunger 146 remains in its centered position, the pressure on the corresponding side of the piston assembly will be decreased. Thus, if the shaft 142 tends to move to the left as viewed in Figure 3, vacuum applied through the port 198 and conduit 94 will act on the piston 140 to move the piston and restore it to its centered position and likewise if the shaft tends to move to the right, vacuum acting through the conduit 194, port 200 and passage 204 will move the piston to the left and restore it to its centered position.

The conduit 194 is connected to the main engine intake manifold through a restricted aperture so that this centering effect will not interfere with the shifting of the front axle drive clutch by the auxiliary engine vacuum when the valve 100 is put in shifting position by the main engine transmission. The restriction of the openings connecting conduits 94 and 96 with the atmosphere by valve member 146 when in its centered or neutral position is, however, greater than the restriction in the main engine manifold vacuum connection, and the main engine manifold vacuum is effective to perform the above described centering operation.

Centering springs 206 and 208 acting directly on the piston assembly function to assist the above-described pneumatic mechanism in maintaining the piston in a centered position and also maintain the piston in its center position when the main engine is not operating so that the auxiliary engine will not be accidentally engaged while the vehicle is idle. However, these springs may be omitted if desired without affecting the scope of the invention.

Referring particularly to Figure 7, the valve, generally indicated at 48 in Figure 1, comprises an outer casing 210 in which is journalled a manually turnable shaft 212. The casing is dome-shaped and is provided with an end closure member 214 into which the ends of the conduits 46 and 50 extend, as indicated at 216. Within the casing there is a valve disc 218 secured to the shaft 212 and provided with a groove or well 220 which, in one position of the valve disc, connects the conduit 46 with the conduit 50 and in another position connects the conduit 46 with the atmosphere through the filter 222 and blocks off the conduit 50. A compression spring 224 maintains the disc 218 in firm contact with the inner surface of the end closure member 214 and suitable stops, as indicated at 226, are provided to determine the limiting positions of the valve disc. The shaft 212 projects entirely through the casing and at one end carries a torque arm 228 which actuates the electric switch 124 shown in Figure 1.

The vacuum operated switch, generally indicated at 128 and particularly illustrated in Figure 6, comprises a fluid-tight casing 230 divided into three separate chambers by two transverse diaphragms 232 and 234. The central chamber includes a pair of oppositely disposed, relatively fixed contact points 236 and 238; the lower diaphragm carries a contact point 240 engageable with the fixed contact 236 but these contact points, while provided for the normal anticipated operation of the device as a shift signal or transmission shift control, are not utilized in the auxiliary engine starting control. The upper diaphragm carries a movable contact point 242 engageable with a fixed contact 246 secured in the top wall of the casing 230. A main air flow measuring venturi 248 is disposed between the carburetor 250 and the main engine intake manifold 62 and a fluid pressure conduit 251 leads from the space ahead or upstream of the Venturi throat through an opening in the bottom wall of the casing 230 to the space below the diaphragm 234 applying to the diaphragm pressure dependent upon the main engine throttle position and the speed and load of the main engine.

Conduit 254 leads from the Venturi throat into the middle chamber between the diaphragms 234 and 232 normally inducing sub-atmospheric pressures in this chamber.

In the pressure responsive unit, spring 260 is adjusted to urge diaphragm 232 upwardly with a predetermined force and this force is opposed by resultant pressure conditions induced by conduits 251 and 254 in the chambers to which they are connected.

When the main engine can no longer efficiently handle the load, the induced pressures are such that the spring 260 will force the diaphragm 232 upwardly bringing the contact 241 into engagement with the contact 246, thus closing the circuit from the switch 124 to ground, the battery 120 being grounded at the side thereof opposite the connection of the conductor 118, completing the ignition and starting circuit for auxiliary engine 54.

*Operation*

Assuming that the vehicle is in operation with the main engine driving through the direct or high speed gear of the main transmission 32 and through the high speed ratio of the rear axle drive gear and that a grade is encountered which necessitates a change to the low speed ratio of the rear axle drive gear, the manual knob or handle 262 of the valve 48 is moved to connect the vacuum line 50 with the vacuum line 46 through this valve. This movement of the valve handle causes the rear axle drive gear to shift to its low speed ratio and moves the torque arm 228 to close the switch 124. The auxiliary engine starting and ignition circuit is now closed except for the open switch in the vacuum actuated unit 128. If now the speed of the main engine is retarded with the main engine throttle substantially entirely open, the induced pressures in the unit 128 will become insufficient to maintain the contacts 241 and 246 separated and, at a predetermined main engine speed, these contacts will close, thereby completely closing the circuit for the auxiliary engine starting and ignition operation. The auxiliary engine will start and its manifold vacuum acting through the conduit 98, the valve 100 in the operative position shown in Figure 4a, and the power unit 92 will shift the two speed front axle drive gear into the high speed ratio and the auxiliary engine will then drive the front wheels of the vehicle adding, in at least one proposed installation, approximately fifty-three per cent of the main engine power to the total power of the vehicle. If it proves impossible to gain speed or maintain the previous speed under these conditions, the driver of the vehicle may then shift the main transmission to the second highest speed which, in the conventional four speed truck transmission, is the third speed next to the direct drive. Shifting of the main transmission will change the valve 100 to the position shown in Figure 4b reversing the operation of the power unit 92 which will shift the front axle gear drive from the high speed ratio to the low speed ratio which, as above set forth, may correspond to the transmission ratio immediately below direct drive times the low ratio of the rear axle.

If it should become necessary to shift the main transmission to a lower speed gear ratio, as the transmission is passed through neutral, valve 100 is shifted to the neutral position, shown in Figure 4, and then finger 148 is disengaged from member 160 leaving valve 100 in neutral position. As explained above, atmospheric pressure will now be connected to both sides of piston assembly 140 through restricted apertures. The pneumatic centering means, aided by the centering springs 206 and 208, if included, will now act to center the piston assembly and declutch the front axle drive. The increased speed of the main engine will also then cause induced pressures in the unit 126 such that the force of spring 260 will be overcome and contacts 244 and 246 will be separated by movement of diaphragm 232, interrupting the auxiliary engine ignition circuit and causing cessation of auxiliary engine operation. The vehicle will now be driven in a low speed high torque ratio by the main engine 20 only.

In starting the vehicle under heavy load with the rear axle in its low speed ratio as the transmission is shifted into the speed immediately below direct drive, finger 148 will pick up member 160 of valve 100 and will shift the valve to the position shown in Figure 4b, and if the main engine 20 is then under sufficient load unit 126 will then close the starting circuit for auxiliary motor 54 which will start up, draw a partial vacuum in conduit 98 and the front axle will then be shifted from neutral into its low speed ratio. The auxiliary motor will then help drive the vehicle so long as it is needed to drive the vehicle efficiently. As the speed picks up, the driver can then shift into direct drive or high gear which will shift valve 100 to the position shown in Figure 4a and will cause the front axle to be shifted into its high ratio. As the power demand drops off or the speed increases beyond the efficient driving range of the auxiliary engine so that the main engine can alone handle the load efficiently, then unit 126 will open the auxiliary motor ignition circuit and the auxiliary motor is stopped until it will be again needed.

If desired, the auxiliary engine starting and ignition circuit may be under control of a manually actuatable switch instead of the automatic control described above in which case the vehicle driver would bring the auxiliary engine into operation when needed and discontinue its use when not required. In either case, the throttles of the two engines are interconnected for simultaneous operation, the usual accelerating pump or economizer being omitted from the auxiliary engine carburetor to avoid pumping of fuel into the manifold when the auxiliary engine is not operating. The auxiliary engine can operate satisfactorily without an accelerating pump or economizer since it normally operates only at high torque and within a limited speed range.

While the vehicle has been illustrated with the auxiliary engine drivingly connected to the front axle on which the steering wheels are mounted, this auxiliary engine may be drivingly connected to some other axle, such as a trailer axle, without in any way exceeding the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle having two driving axles, a main engine connectible with one axle and an auxiliary engine connectible with the other axle; means providing a plurality of available drive speed ratios in each said axle, a change speed transmission for said vehicle interposed only in the drive connection between said main engine and said one axle, means at each of said axles for selecting said drive speed ratios, and control means for said selecting means enabling both axles to be currently driven only when the selected drive ratio of said other axle corresponds to a predetermined drive ratio of said one axle combined with a predetermined transmission ratio.

2. In an automotive vehicle having two driving axles, a respective engine drivingly connectible with each axle; a respective two speed axle drive gear operatively associated with each axle and with the respective engine; a change speed transmission interposed between one of said engines and the corresponding two speed axle drive gear; and means actuated by said transmission in a selected portion of its speed changing operation and operable only upon selection of a certain speed of said corresponding two speed axle drive gear for shifting the other two speed axle drive gear.

3. In an automotive vehicle having two driving axles; a respective engine drivingly connectible with each; a respective two speed drive gear operatively associated with each axle and with the respective engine, the high speed ratio of one of said two speed drive gears being substantially the same as the low speed ratio of the other of said two speed drive gears; a four speed change speed transmission having a direct drive ratio and a third speed ratio operatively interposed between said other two speed axle drive gear and its associated engine; and means actuated by said transmission and operatively connected with said one two speed axle drive gear, operative to shift said one axle drive gear to its high speed ratio when said transmission is in direct drive, and to shift said one axle drive gear to its low speed ratio when said transmission is in third speed drive.

4. A vehicle as defined in claim 3 including means effective to render said shifting means for said one two speed axle drive gear ineffective to shift said drive gear out of its neutral condition except when said other two speed axle drive gear is in its low speed ratio.

5. In an automotive vehicle having two driving axles; two engines independently connected one to one of said axles and one to the other; a respective two speed axle drive gear operatively associated with each axle and with the corresponding engine; a drive including a change speed transmission between one of said engines and the corresponding two speed axle drive gear; and a direct driving connection between the other engine and its corresponding two speed axle drive gear, the directly driven axle having speed ratios corresponding to certain predetermined combined speed ratios of the other axle and its associated transmission; and control means maintaining said direct driving connection inoperative except upon selection of one of said predetermined speed ratios for said other axle and its transmission.

6. In an automotive vehicle having two driving axles and two engines; a respective two speed axle drive gear operatively associated with each axle; manual means for shifting one axle drive gear between its high speed and low speed gear ratios; means including a manually shiftable change speed transmission drivingly connecting one of said engines to said one axle drive gear; and means rendered effective by said manual shifting means when said one two speed axle drive gear is shifted to its low speed ratio, and actuated by said manually shiftable transmission in its highest and next to highest speed ratios respectively, operative to shift the other of said two speed axle drive gears to its high and low speed gear ratios respectively.

7. In an automotive vehicle having two multi-speed driving axles; a main engine drivingly connectible with one of said axles; an auxiliary engine drivingly connectible with the other of said axles; means for starting said auxiliary engine; and means rendering said starting means ineffective to start said auxiliary engine except when said main engine is connected with said one multi-speed axle through a low speed ratio thereof and the manifold pressure of said main engine is above a predetermined value.

8. In an automotive vehicle having two driving axles; a two speed drive gear in each axle; a main engine drivingly connectible with one two speed drive gear; a change speed transmission interposed between said main engine and said one two speed drive gear; an auxiliary engine drivingly connectible with the other two speed drive gear; means for shifting said one two speed drive gear between its low speed and high speed gear ratios; means controlled by said shift means for starting said auxiliary engine only when said one two speed drive gear is in its low speed gear ratio; and means actuated by said change speed transmission operative to shift said other two speed gear drive to its low speed and high speed gear ratios respectively only when said auxiliary engine is running.

9. An automotive vehicle as defined in claim 8 wherein said transmission actuated means is effective to disconnect the driving connection between said auxiliary engine and said other two speed drive gear whenever said change speed transmission is shifted to a neutral position.

10. An automotive vehicle as defined in claim 8, wherein said means operative to shift said other two speed gear drive to its low speed and high speed gear ratios respectively comprises a pneumatic power unit mechanically connected with said gear drive and a reversing valve mechanically connected with said change speed transmission and pneumatically connected with said power unit and with the intake manifold of said auxiliary engine.

11. In an automotive vehicle having a main engine and an auxiliary engine, a driving axle connectible with said auxiliary engine; a two speed drive gear in said axle including a clutch member operative to implement either gear ratio thereof; and a pneumatic power unit having a displaceable element operatively connected with said clutch member; selectively actuatable means for maintaining said clutch in neutral position disconnecting said auxiliary engine from said axle, comprising a centering valve mechanically connected with said displaceable element and pneumatically connected with the opposite ends of said power unit and with the intake manifold of said main engine.

12. In an automotive vehicle as defined in claim 11, a pair of centering springs operatively associated with said displaceable element to maintain said clutch in neutral position when said main engine is not operating.

13. An automotive vehicle as defined in claim 7, wherein said auxiliary engine starting means includes an ignition and starter circuit having in series, a switch closed upon shifting said one two speed drive axle to its low speed gear ratio, and a vacuum actuated switch pneumatically connected with the main engine intake manifold.

14. A vehicle comprising a main engine; a change speed transmission driven by said main engine; a drive axle driven by said transmission; an auxiliary engine; a second drive axle driven by said auxiliary engine; a clutch operative to disconnect said auxiliary engine from said second drive axle; means actuated by said change speed transmission operative to control said clutch; and means responsive to the loading of said main engine controlling the operation of said auxiliary engine.

15. In a vehicle having two drive axles and two individual power plants each drivingly connected to a respective drive axle; multi-speed mechanism in each axle, a speed ratio selector operatively associated with each multi-speed axle mechanism, a change speed transmission between one axle and its associated power plant only, one of the drive speed ratios of said other axle corresponding to a predetermined combined drive speed ratio of said transmission and said one axle, and control means precluding drive of said vehicle by both axles except upon selection of said corresponding speed ratios.

16. In a vehicle having a multi-speed rear axle drive-connected to a main engine and a multi-speed steer drive front axle drive-connected to an auxiliary engine, fluid pressure actuated speed selector means at each of said axles for changing the drive speed ratios of said axles, a variable speed transmission in the drive connection between said main engine and said rear drive axle, speed selector means for said transmission, said auxiliary engine providing a source of fluid pressure for actuation of said speed selector means for said steer drive axle, and valve means controlled by said transmission speed selector means for controlling the application of said fluid pressure to said speed selector means for said steer drive axle when said auxiliary engine is in operation.

17. In the vehicle defined in claim 16, additional means responsive to operation of the main engine for preventing operation of the fluid pressure actuated speed selector means for said steer drive axle when the auxiliary engine is not in operation.

18. In a vehicle having a multi-speed rear axle drive connected to a main engine and a multi-speed steer drive front axle drive connected to an auxiliary engine, speed selector means at each of said axles for changing the drive speed ratios of said axles, a variable speed transmission in the drive connection between said main engine and said rear drive axle, speed selector means for said transmission, a source of power for said speed selector means for said steer drive axle, and means actuated by said transmission speed selector means for controlling application of said power to said speed selector means for said steer drive axle when said auxiliary engine is operating.

19. In a vehicle having a rear axle drive-connected to a main engine and a steer drive axle drive-connected to an auxiliary engine, a variable speed transmission in the drive connection between said main engine and said rear drive axle, means for shifting speeds in said transmission, speed selector means providing at least high and low drive speed ratios at said rear axle, speed selector means providing at least high and low drive speed ratios at said steer drive axle and having a neutral position wherein said steer drive axle is not driven, a source of power operable for actuating said speed selector means for said steer drive axle only when said auxiliary engine is operating and means controlled by said transmission speed shifting means for controlling application of said power to the speed selector means for said steer drive axle when said auxiliary engine is operating.

20. In the vehicle defined in claim 19, means responsive to operation of the main engine tending to maintain the speed selector means for said steer drive axle in neutral when said auxiliary engine is not operating.

21. In the vehicle defined in claim 19, means for actuating said speed selector means for said rear axle and for rendering said auxiliary engine operable or inoperable for permitting said steer drive axle to be driven by said auxiliary engine only when said rear drive axle is being driven at its low drive speed ratio.

22. In the vehicle defined in claim 19, means for actuating said speed selector means for said rear axle and for rendering said auxiliary engine operable or inoperable for permitting said steer drive axle to be driven by said auxiliary engine at its high drive speed ratio only when said rear axle is driven at its low drive speed ratio and said transmission is in substantially direct drive, and permitting said steer drive axle to be driven by said auxiliary engine at its low drive speed ratio only when said rear axle is driven at its low drive speed ratio and said transmission is in a speed lower than direct drive.

23. In the vehicle defined in claim 19, said speed selector means for the front steer drive axle comprising a fluid pressure responsive device and said source of power comprising the intake manifold pressure of said auxiliary engine, a conduit between said auxiliary engine and said fluid pressure responsive device, and said last-named means comprising a valve in said conduit operated by said transmission speed shifting means.

24. In a vehicle having a rear drive axle drive-connected to a main engine and a steer drive front axle drive-connected to an auxiliary engine, a variable speed transmission between said rear axle and said main engine, speed shifting means for said transmission, said steer drive axle having speed selector means for driving it at a high speed, a low speed and for disconnecting it from drive by said auxiliary engine, means responsive to operation of said main engine tending to maintain said steer drive axle disconnected from drive by said auxiliary engine, and means responsive to operation of said auxiliary engine and when said transmission is in predetermined high speeds for rendering said last-named means inoperable and actuating said speed selector means.

25. In a vehicle, a multi-speed rear drive axle drive-connected with a main engine, a variable speed transmission and a disengageable clutch in said drive connection, a multi-speed front steer drive axle drive-connected to an auxiliary engine, fluid pressure responsive speed selector means at both axles, a conduit supplying intake manifold pressure of said auxiliary engine to said fluid pressure responsive device for the front axle speed selector means, said drive connection between the auxiliary engine and the steer drive axle having no variable speed transmission and no disengageable clutch such as is used between the engine and transmission in the usual automotive vehicle, means for shifting speed in said variable speed transmission, and valve means in said conduit controlled by said transmission speed shifting means for controlling said speed selector means for the front axle.

BEVERLY W. KEESE.
WALTER F. ROCKWELL.